Aug. 27, 1957 R. F. BRENNEN ET AL 2,804,536
DEVICE FOR AUTOMATICALLY CLOSING WELDER SWITCH
Filed Nov. 23, 1954
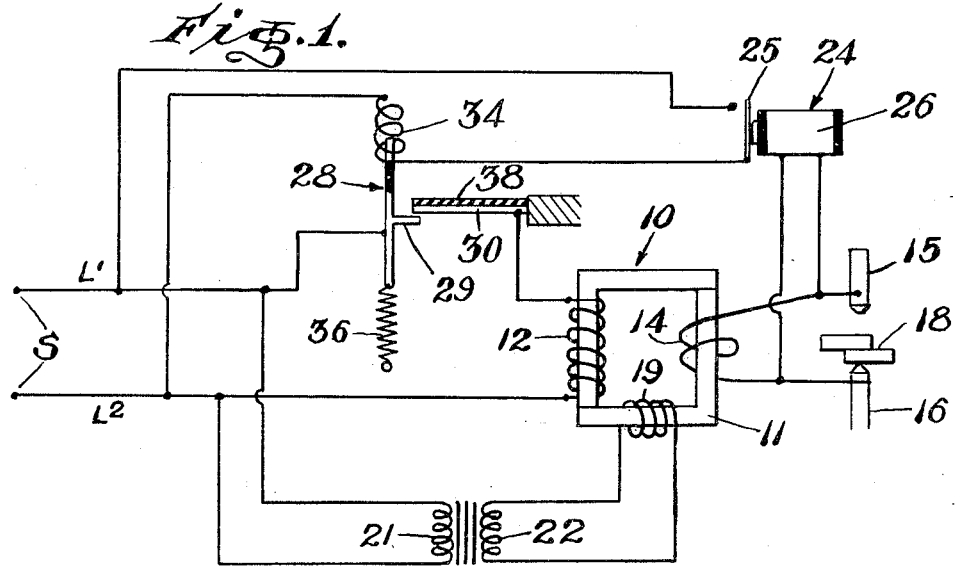
Fig. 1.
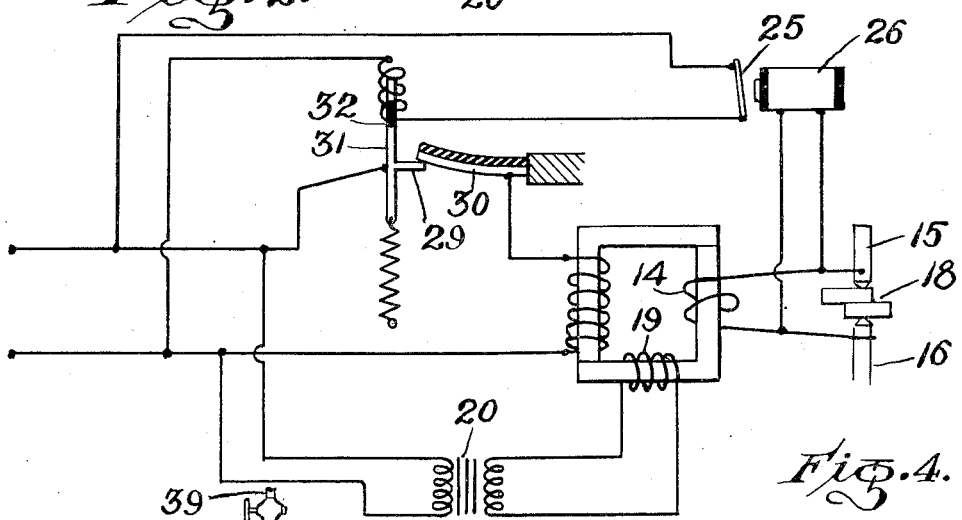
Fig. 2.
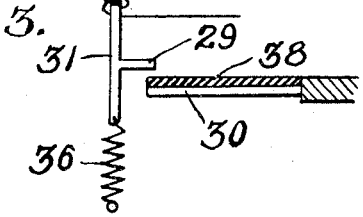
Fig. 3.
Fig. 4.
INVENTORS
RONALD F. BRENNEN
JAMES A. BUCCI
BY
F. R. Jenkins
ATTORNEY.

United States Patent Office 2,804,536
Patented Aug. 27, 1957

2,804,536

DEVICE FOR AUTOMATICALLY CLOSING WELDER SWITCH

Ronald F. Brennen and James A. Bucci, Brooklyn, N. Y., assignors to Welding Industry Research & Patent Corporation, New York, N. Y., a corporation of New York Application November 23, 1954, Serial No. 470,563

3 Claims. (Cl. 219—110)

This invention relates to electric welders and more particularly to single phase alternating current welders, which are essentially step down transformers.

Particularly in spot welding, it has long been known that when welds of a desired quality are to be produced, the duration of current flow through work pieces is critical. The duration of flow should be controlled according to the nature of the work pieces, their size and shape to mention only a few of the conditions.

The present state of the art affords satisfactory means for enabling a flow of high amperage commercial current to be obtained within highly accurate limits of duration. However this does not mean that the accurately measured duration occurs at the correct time with respect to the desired position of the electrodes and the work pieces. Even though the primary of a welding transformer may be connected for, say, one-tenth second to a supply line, it frequently happens, in high speed welders, that sparking at the electrodes occurs due to premature rise of welding voltage, and a short duration of welding current follows.

Attempts have been made to synchronize the closure of the primary circuit by mounting a primary switch member on the movable welding electrode so that the switch becomes closed just as the electrodes engage the work pieces. This solution of the problem is satisfactory only as long as the thickness of the work pieces remains constant. If thicker work pieces are encountered the switch will not become closed.

To insure that the source is connected to the primary of the welding transformer at the proper instant and to prevent delay in the application of the welding current to the work pieces after the pieces and electrodes are in operative position, we employ means to connect the source to the primary wherein the means is responsive to a flow of low amperage current through the work pieces and the electrodes. A low potential, which is however higher than the open circuit potential of the secondary of the transformer due to the primary, is constantly applied to the electrodes. When this potential difference between the electrodes is altered, or lowered by engagement of the electrodes with the work, the above mentioned means connects the source to the primary and a welding circuit begins to flow.

An object of this invention is to close a switch, which may be a timer switch, between a source of current and the primary of a welding transformer as soon as the electrodes and work pieces are positioned for welding.

Another object is to eliminate the need for mechanically connecting switch means to electrodes.

These and other objects and advantages are obtained in our welder which, briefly described, includes a welding transformer having a primary and secondary with electrodes connected to the latter and means for connecting a source of current to the primary as soon as the electrodes are electrically connected to each other externally.

In the accompanying drawing showing, by way of example, two of many possible embodiments of the invention, Fig. 1 is a diagrammatic representation of the welder showing same before welding takes place;

Fig. 2 similarly shows the welder after welding begins to occur;

Fig. 3 shows the timer switch after the weld has been completed; and

Fig. 4 shows a modification of the invention.

The welding system as shown comprises a welding transformer 10 having a core 11 of suitable shape, a main primary winding 12, and a secondary winding 14 having the respective terminals thereof connected to oppositely positioned welding electrodes 15, 16. The electrodes are movable toward each other and are adapted to engage on work pieces 18 to weld together same. The open circuit voltage at the electrodes, when the primary is connected to a commercial source of power S is low say of order of 2.5 to 3 volts.

The same core 11 bears small auxiliary primary winding 19 fed constantly by the output of an auxiliary or second transformer 20 connected substantially directly to the line of a suitable supply of alternating current such as the same commercial source of power S. The open circuit voltage across the electrodes due to the auxiliary primary is higher than that due to the primary 12, say, about 6 volts.

The auxiliary transformer 20 is of the type, such as the ordinary door bell transformer, wherein its primary 21 is of such a high impedance or reactance that its secondary 22 may be safely short circuited. If the output of the auxiliary transformer is at say 18 volts and there are 9 turns in the auxiliary primary 19, 3 turns in the secondary 14, the open circuit voltage at the electrodes is about 6 volts.

A relay 24 having a switch 25 biased to open position and a winding 26 has the terminal ends thereof connected to the respective electrodes. The relay is so constructed and proportioned that it becomes energized when the said 6 volt output is applied to the winding 26 and the switch 25 is held open.

Thus as long as the electrodes 15 and 16 are not in electrical contact, the switch 25 remains open. If the electrodes are brought into electrical contact, as through the conductive work pieces 18, the weak output due to the auxiliary primary current is short circuited and the relay winding 26 is deenergized so that switch 25, being biased to do so, closes.

The switch 25 might itself be interposed between the supply S and the main primary winding 12 so that when the relay 24 is deenergized the supply S is connected to the primary 12 to accomplish the welding of the work pieces. However it is preferable to employ the medium of a timer switch 28 having a switch 29, 30 biased to open position to connect the supply S to the primary 12.

The timer switch 28 may be of conventional design but is shown diagrammatically as comprising a flexible conductor blade 30 having the end portion of the lower face thereof engageable by a vertically reciprocatory contact member 29 mounted on a rod 31 bearing an armature 32 cooperating with a solenoid 34 connected, through the switch 25, to the source line $L_1L_2$.

As the switch 25 closes the solenoid 34 raises the armature, rod and member 29 causing the latter to engage the leaf 30 as in Fig. 2, thereby connecting the source S to the primary 12 and causing a welding current to be induced in the secondary 14 and flow through the work pieces to effect a weld.

The rate of movement of the rod and contact member 29 determines the length of time the switch 29, 30 remains closed, say a half a second, before the member 29 slips off the flexed end of the blade and rises above same to reopen the switch. The rate of movement may be controlled by a pneumatic dash pot 35 (Fig. 3) on the rod.

When the electrodes are electrically separated, the coil 26 becomes energized, the relay switch 25 opens, and the biasing spring 36 draws the conductor 29 below the blade 30 to the position in Fig. 1. To prevent a closure of the switch 29, 30 as the original condition is being restored, the upper face of the blade is provided with insulation 38.

It is to be understood that the rate of movement of the rod during energization of the coil 34 may be varied by adjustment of the dash pot as by valve 39.

When the timer switch 28 is used the voltages are not critical except to the extent that the auxiliary primary must draw sufficiently on the source to produce an output great enough to cause switch 25 to open when the electrodes are separated, and the relay 24 must operate at higher voltages than the welding current voltage because of difficulty in short circuiting welding current when work pieces are of higher resistance due to scale or paint thereon, thinness of metal or low load setting.

When the welder is to be shut down the source S may be disconnected from the line $L_1L_2$ by well known means (not shown) to prevent power losses in the transformers.

While the auxiliary primary 19 may be a separate winding as shown in Figs. 1 and 2, the same effect may be obtained by tapping the same number of turns as are in the winding 19 in the main primary 12 to provide a primary portion 19' (Fig. 4) which may be energized by the second transformer 20 and so eliminate the winding 19.

The invention claimed is:

1. A combination comprising a first transformer having main primary, auxiliary primary and secondary windings, the secondary being adapted to be connected to a load; a second transformer having a primary of greater impedance than that of the primary of the first transformer and having a secondary connected to said auxiliary primary, a source of current connected to the primary of the second transformer, a solenoid connected across the secondary of the first transformer, and means responsive to current change in the solenoid for connecting said source to said main primary when the current in the solenoid is decreased.

2. In a welding system, a transformer having a primary winding and a secondary winding, a source of current, a circuit between said source of current and said primary including a normally open switch biased to close for connecting the primary to the source, electrodes connected to said secondary winding, electromagnetic means also connected to said secondary winding for holding said switch open when current flows therethrough, an auxiliary primary winding on said transformer independent of said primary and said secondary windings, and a second transformer energized by said source and operatively connected to said auxiliary winding for causing a current to flow in said secondary winding and consequently in said electromagnetic means at least when said switch is open and said source is disconnected from said primary.

3. In a welding system, a source of current, a first transformer having a core carrying primary, secondary and tertiary windings; a second transformer having a core carrying a primary of greater impedance than that of said first primary and also having a secondary, said last secondary being connected to said tertiary winding for supplying a magnetomotive force to the core of said first transformer, said second primary being connected to said source, a pair of welding electrodes connected to said first secondary winding, relay means having an actuating winding bridging said electrodes and having switching means biased to close when said winding is de-energized when said electrodes are shorted by contact with an article to be welded, and a circuit between said source, said first primary winding and said switching means completed by the closing of the latter to initiate a welding operation.

References Cited in the file of this patent

UNITED STATES PATENTS

| 520,970 | Scott | June 5, 1844 |
| 1,327,792 | Thornton | Jan. 13, 1920 |
| 1,976,552 | Friesen | Oct. 9, 1934 |
| 2,112,716 | Smith | Mar. 29, 1938 |
| 2,438,490 | Ashford et al. | Mar. 30, 1948 |

FOREIGN PATENTS

| 727,702 | France | Apr. 4, 1932 |